March 3, 1936.  C. W. NEWHALL, JR., ET AL  2,032,493
CABLE TESTING DEVICE
Filed Sept. 30, 1932  5 Sheets-Sheet 1

Inventors
Charles W. Newhall Jr.
Ted B. Morse

March 3, 1936.   C. W. NEWHALL, JR., ET AL   2,032,493
CABLE TESTING DEVICE
Filed Sept. 30, 1932   5 Sheets-Sheet 5

Inventors:
Charles W. Newhall Jr.
Ted B. Morse
By Mason Jackson Boettcher Dunner
Attys.

Patented Mar. 3, 1936

2,032,493

UNITED STATES PATENT OFFICE 2,032,493

CABLE TESTING DEVICE

Charles W. Newhall, Jr., Evanston, and Ted B. Morse, Chicago, Ill.

Application September 30, 1932, Serial No. 635,580

21 Claims. (Cl. 175—183)

This invention relates to testing devices, and more particularly to insulated conductor testing devices for analyzing and localizing faults in an insulated conductor, whether it be a high tension or overhead transmission line, an underground cable, or other lines involving insulated conductors or their equivalents, hereinafter referred to generically as cables.

The invention is applicable for use in connection with the analysis and location of faults in cables where an electrical circuit may be completed through the faulted conductor and a clear conductor, or the faulted conductor and a conductor having a fault of a different degree of resistance than the faulted conductor.

The invention is based upon the use of the Murray loop and Wheatstone bridge principles, and is adapted to increase the scope of application of these principles to the analysis and localization of a cable fault so that it may be used for situations which have heretofore been out of the range of apparatus employing these principles. The present apparatus is capable of analyzing and localizing faults accurately and quickly without requiring the reduction of the fault to a low resistance. This is of decided advantage in cases where the fault renders a consumer's line inoperative, since, in many cases, no delay is occasioned, as is the case in present types of testing devices where it is often necessary to burn the fault through to the cable sheath in order to provide a low resistance to ground.

In the preferred embodiment of the invention, we provide apparatus for analyzing and localizing insulated faults which comprises two units of equipment. A low tension test circuit and direct current supply set, the supply set using mercury vapor tubes for rectifying any alternating current supply up to the limiting direct current output voltage of the tubes, comprises one unit. To obtain a desired voltage limit, we may also use any type of portable or permanently installed voltage rectifying device, such as 30 kv. Kenotron outfit, or the like. The other unit of the equipment comprises a Murray loop and a Wheatstone bridge circuit, and is equipped with suitable switches whereby the circuits may be easily shifted. The two units are mounted in suitable instrument boxes, which may also contain all the necessary supply leads, control rods and insulating legs, and which are portable and capable of withstanding severe shocks that may occur when the apparatus is being transported for use in field work.

We also contemplate providing apparatus that may be permanently installed in generating stations, sub-stations and the like, whereby it will be possible for the attendant at such a station to analyze and locate cable faults without the necessity of outside field resistance. Thus it will be possible for the attendant, at any time that a fault occurs in a cable conductor leading from his particular station, to determine the location of the fault by the use of equipment permanently installed in the station, and to have the necessary repairs made immediately, which will greatly decrease the time that the cable is rendered inoperative.

In the operation of the apparatus, the low tension testing circuit is first connected to the conductor which is faulted, and has its one side grounded to complete a circuit to the grounded fault. The testing circuit will then determine the approximate resistance of the fault. From this, the magnitude of the voltage necessary to pass a current through the fault can be determined. A jumper is then connected between a clear conductor and the faulted conductor at their far ends, and the terminal ends of these conductors are connected to the terminals of the Wheatstone bridge circuit. The known resistances of the bridge circuit are then varied, and thus the exact resistance of the conductors is determined, and, if there are any breaks in the conductors, these will show up.

If the above tests indicate continuity of conductors and that a loop measurement can be made, the apparatus may be used to locate definitely an insulated conductor fault regardless of the resistance of the fault. Any direct current source up to the limiting insulation value of the cable line may be used. For low and medium resistance faults, the direct current supply set, which in this embodiment of the invention will supply voltage up to the limiting value of the tubes, may be used. For higher voltages, other portable or permanently installed direct current supply sets or apparatus may be employed. The limiting insulation of the loop in the present embodiment of our invention is about 100,000 volts direct current, but it is to be understood that this may be increased without departing from the scope of the present invention.

The feature of providing a testing and localizing set which is capable of universal application of voltages, with either a direct or alternating current source of supply, up to the limiting insulating value of the loop, is, we believe, broadly new. The set is adapted for use with any voltage which may be available. This universality of voltage application enables the analysis and location of faults in which two continuous electrical paths, one being the faulted conductor, and the other being either a clear conductor or a conductor having a fault of different resistance at the same point, can be provided.

In determining the location of the fault, the loop is connected through specially calibrated leads to the ends of the two conductors previously described, although the loop may be directly connected to the conductors, if desired. It is to be understood that the loop may also be employed with a Fisher connection in situations in which such a connection finds use. These calibrated leads include clamping portions at their ends which are adapted to have positive contact with the terminal ends of the conductors, and the resistance of these leads may be calculated in terms of the length of the conductors being measured. Preferably, the resistance of the leads are calculated for equivalent lengths of different sizes of conductors, so that regardless of the size of the conductor, the resistance of the lead in equivalent length of the conductor is known. We have found that the use of these leads, as compared to other types of leads, is particularly advantageous when it is desired to locate faults that may be in proximity to the terminal ends of the conductor, and to speed up calculations.

The loop resistance, which in the present embodiment of the invention comprises a spiral slide wire which is considered to be particularly advantageous, is then varied until the resistance through the portion of the loop connected to the clear conductor and through the clear conductor and the jumper wire to the fault is exactly proportional to the resistance through the other portion of the loop and through the faulted conductor to the fault. This balancing is determined by means of a galvanometer connected across the ends of the slide wire, and which is capable of being balanced when the resistances have been made proportional. After this position has been determined, it is then possible to determine the exact location of the fault with reference to the length of the conductor by means of suitable simplified calculations.

A feature of the present invention resides in the provision of a spiral slide wire of standard make which is accurately calibrated. By providing a spiral wire, increased accuracy over previous equipment is obtained because of the increased length of the wire, without increasing the spacial requirements of the apparatus. This is particularly advantageous in portable equipment. Also, this type of slide wire is simpler to operate, particularly adapted for high voltage use, capable of better contact, and more accurate. We further provide a resilient cushioning clamp which fits over the slide wire casing during transportation of the equipment in order to protect the slide wire from vibration and possible loss of accuracy thereby. It is also desirable to provide some means for protecting the slide wire against dust, which we do by building up an enclosing fence thereabout, which may or may not be permanently installed. If desired, the slide wire and associated clamp may be mounted upon a subpanel in order to reduce the vertical extent of the bridge and loop equipment, and thus also shielding the wire against dust, etc., which might alter its calibration.

Many of the calculations involved in the analysis and location of the faults may be worked out and tabulated in suitable tables, which may be carried in one of the testing units, and which provide ready means for ascertaining, in terms of resistance or distance, the linear length of conductor that is being tested, for the purpose of determining at what point along the length of the conductor the fault is located. These tables reduce to a considerable extent the calculations necessary, and, together with simplified set-up methods, charts, and calibration of measurements in equivalent terms, provide a simple method of determining the location of the fault.

One feature of the present invention resides in designing the loop for any voltage up to the limiting insulating value of the line without requiring change of connections. In so designing the set, it is apparent that the use of the apparatus is practically universal for testing purposes. It is so designed that any voltage necessary to establish and maintain a current through the fault sufficient to make the necessary measurements, which will be below the limiting insulating value of the set, may be used directly on the instrument. An intermittent arc at the fault will not cause an appreciable inaccuracy in the results. This is due to the special design of the instrument.

The use of small mercury vapor rectifying tubes is distinctly advantageous, because of their high current passing characteristics, and the uniform voltage-drop over the entire voltage range, and also because of their compactness, efficiency, and replaceability. These tubes operate satisfactorily at any voltage up to the limiting value of the tubes, and are capable of efficient control for regulating and supplying the current to the low tension testing equipment and as a source of low voltage direct current supply to the loop and bridge circuits. Throughout the alternating current voltage range, these tubes will pass their rated current. The use of this type of rectifying means in connection with the loop circuit, is, we believe, broadly new. They are capable of rectifying any alternating current supply up to the limiting direct current output voltage of the tubes. As pointed out above, for higher direct current output voltages portable and permanently installed apparatus is available, but we have found that in the majority of cases, the direct current supply set will suffice for maintaining a current through the fault. If desired, the maximum voltage of this supply set may be increased.

The provision of the low tension test circuit in the direct current supply set, operating on the voltage-drop principle, makes this circuit capable of use with the same supply source as that used for the loop, because of the constant voltage-drop characteristics of the mercury vapor rectifiers.

A further feature of the invention is the provision of a tapped choke coil, in series with the galvanometer, used in the bridge and loop circuits, for preventing injury to the galvanometer due to surge currents, induced currents, or the like. This effectively protects the instrument during preliminary balancing, and also, in conjunction with the shunt, chokes out a substantial portion of the heavy surge currents during measurements with a fluctuating supply voltage. Also currents induced in the cable line, due to outside sources, are prevented from entering the galvanometer by means of this series inductance.

Other features, such as the particular arrangements of the contacts and connections in the equipment so that all of the high tension leads are positioned away from the operator, the disposition of the switches for facilitating changing from one circuit to another, and the compact arrangement of the parts which reduces the size of the equipment and increases its portability, will be described more in detail in connection with the following detailed description, which, together with the accompanying drawings, will disclose to those skilled in the art the particular construction and operation of a preferred form of our invention.

Figure 1:
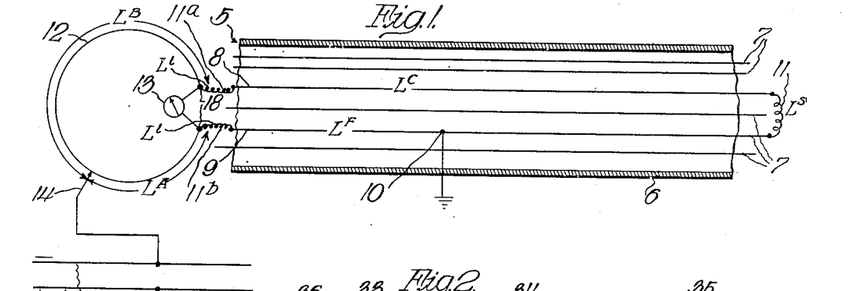
Figure 1 is a diagrammatic circuit illustration showing the application of the Murray loop for analyzing and locating insulated conductor faults.

Referring now in more detail to the drawings, in Figure 1 we have disclosed a diagrammatic circuit illustration of the application of the Murray loop for analyzing and locating insulated cable faults. In this diagram, a cable conductor is shown and indicated generally by the reference numeral 5. This insulated cable conductor comprises the cable sheath 6 surrounding a plurality of individual conductors 7. These individual conductors 7 are of the usual form, and are separated from each other by means of insulation disposed within the cable sheath 6, this insulation being either oil insulation, paper wrapping, tar, asphaltum, rubber, cambric, natural corrosion or the like, which serves to prevent short circuiting between the respective conductors. We have selected two of these conductors, indicated specifically by the numerals 8 and 9, and cable 8 being a clear conductor, or, in other words, having no faults or a fault of different magnitude at the same location than that of the faulted conductor throughout its length, whereas the cable 9 is shown as being faulted at 10, to ground. At the far end of the conductors we provide a jumper wire indicated by the numeral 11, which is connected between the end of the clear conductor 8 and the end of the faulted conductor 9.

At the terminal ends of the cables 8 and 9 we connect the loop 12 through the specially calibrated leads 11a and 11b, which loop is provided with a galvanometer 13 connected between these terminals and the ends of the loop 12. A suitable sliding contact 14 is illustrated as moving about the loop 12, this corresponding to the contact made upon the spiral slide wire mentioned above. A suitable source of direct current supply is indicated at 16, and has the one side thereof grounded, as indicated at 17. A circuit is thus established flowing from the one side of the power supply 16 to the movable contact 14, and from there the current is split, part flowing through the major portion of the loop 12 and through the clear conductor 8 to the end of this conductor, and from there is carried by means of the jumper wire 11, across to the end of the faulted conductor 9, and from there returns through the faulted conductor to the fault, indicated at 10. The other portion of the current passes from the contact 14 through the faulted conductor 9 to the fault 10 and is thereby grounded, thus completing the circuit to the grounded other side of the power supply 16.

In operation, after the approximate resistance of the fault and the continuity of the conductors has been determined, the movable contactor 14 is moved about the resistance or loop 12 until a point is reached at which the current across the terminal points 18 of the loop is such that the galvanometer 13 will read zero. This indicates that the resistances of the loop have been balanced. The proportions existing between the various parts of the circuit, as shown in Figure 1, are the following:

$$\frac{L^A}{L^B} = \frac{L^l + L^F}{L_l + L^c + L^s + (L^c - L^F)}$$

This equation states, in general terms, that the resistance from the contactor 14 to the terminal 18, indicated by the value of $L^A$, is to the resistance of the other portion of the loop 12, from the contactor 14 to the other terminal 18, as the resistance of the lead 11b from the terminal 18 to the conductor 9, indicated by the value $L^l$ plus the resistance of the faulted conductor from the lead 11b to the fault 10, is to the resistance of the other lead 11a, indicated by $L^l$ from the terminal 18 to the conductor 8, plus the resistance of the conductor, indicated by $L^c$, plus the resistance of the jumper wire or short at the far end, indicated by the reference numeral 11 and the reference character $L^s$, plus the total resistance of the conductor 9 minus the resistance of the conductor from the fault to the terminal, indicated by the quantity $L^c - L^F$. These quantities are all measured in equivalent terms, which may be either in ohms resistance or in linear feet of length, and since all but the quantity $L^F$ are known, it is an easy matter to determine the value of $L^F$. Preferably, these measurements are calibrated in terms of distance, so that in solving the equation, the exact distance from the end of the conductor 9 to the fault will be determined.

Figure 5:
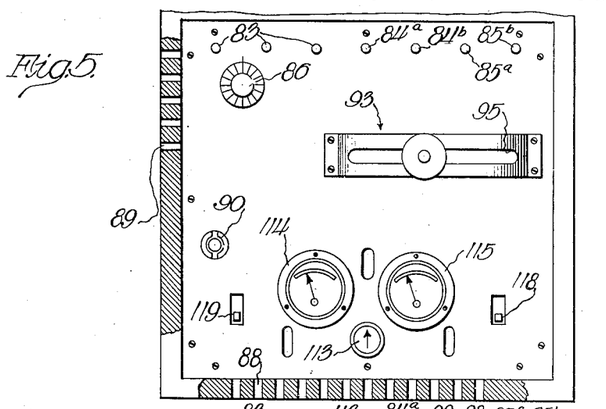
Figure 5 is a plan view of the housing and apparatus comprising the low tension testing circuit and the direct current supply set.
Figure 6:
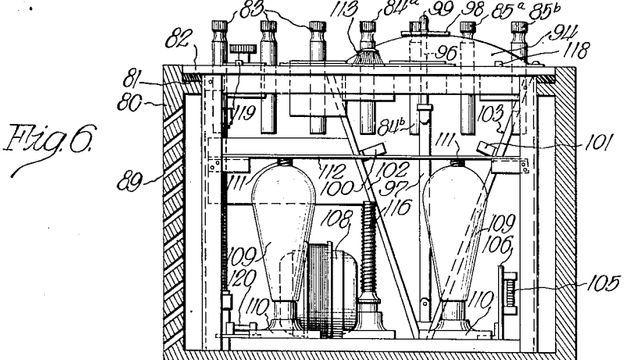
Figure 6 is a sectional elevational view of the same.
Figure 7:
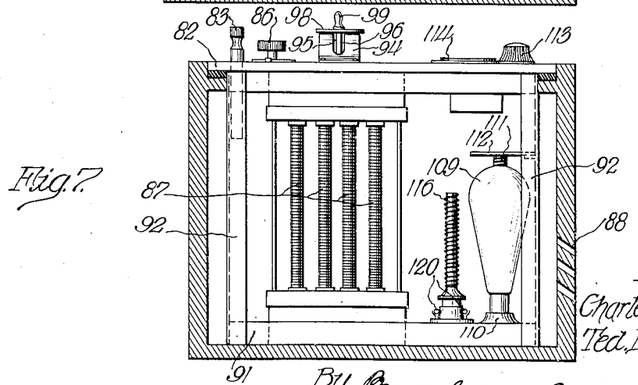
Figure 7 is an end sectional elevational view.

Referring now in detail to Figures 5, 6, and 7, which disclose the direct current supply set and the low tension testing circuit apparatus for use in the testing of the faulted conductor, this apparatus is mounted within a suitable box indicated by the numeral 80, this box having an inner projecting portion 81 surfaced with rubber or similar cushioning material for supporting the panel 82 upon which the apparatus is mounted. This box 80 is also provided with a cover (not shown) which is secured thereto by means of suitable locking means, and a suitable handle or strap or other similar device for the purpose of facilitating its transportation in field use is provided on the case. Charts and calculation tables may be carried in the cover.

The panel is provided with a plurality of binding posts disposed along the rear side thereof, and because of their position the operator is less likely to come into contact with the connecting supply and output leads, the binding posts 83 comprising the terminals for the alternating current input to the direct current supply, and the terminals 84a and 84b comprising the binding posts for leading out the direct current which has been rectified from the alternating current input. The terminals 85a and 85b are for connection when it is desired to use the low tension testing circuit.

Figures 14, 15, 16:
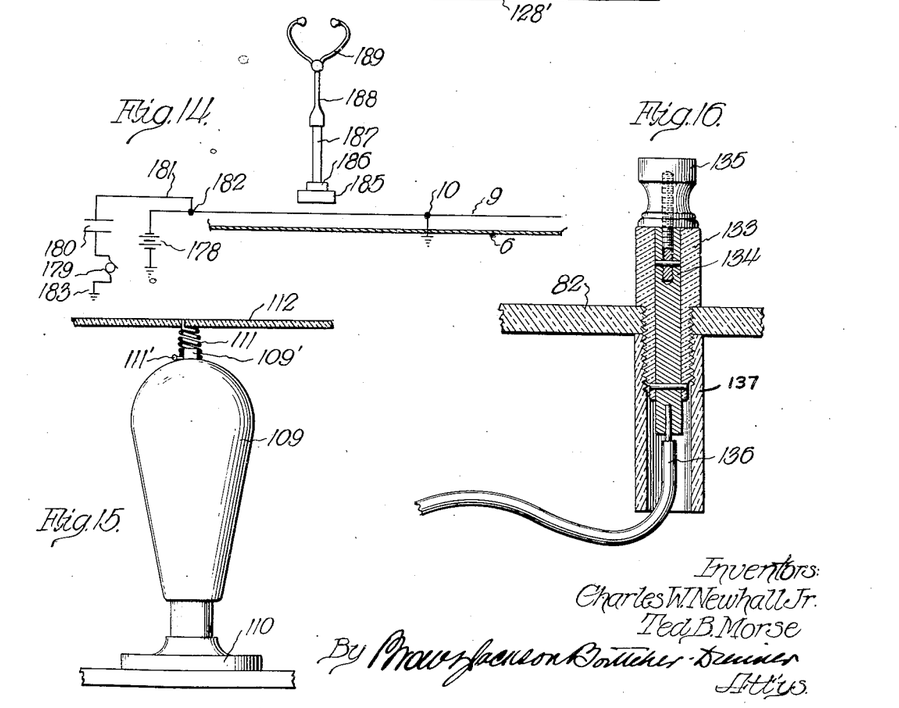
Figure 14 is a diagrammatic circuit illustrating a testing method for checking the location of the fault.
Figure 15 is a detail view of the thermionic tube mounting.
Figure 16 is a detail view of a high tension terminal.

In Figure 16 we have disclosed a modified form of high tension terminal for use in the embodiment of this invention, which is capable of being used for high voltages. This terminal comprises the threaded insulated body portion 133, extending through and secured to the panel 82. The body portion 133 receives a central connecting member 134, which has its outer end threaded to receive the terminal nut 135 for securing a connecting lead. The lower portion of the stem or connecting member 134 is adapted to be engaged by the conductor 136, which leads from the terminal to the switch point 101. This conductor may be threaded to the stem, soldered thereto, or secured in any suitable manner. A cylindrical insulated sleeve 137 is threaded onto the shank of the body portion 133, and extends downwardly past the connection between the stem and conductor. The provision of this sleeve is optional, since the shank may be extended downwardly a sufficient distance beneath the panel 82 to effect the same result.

Disposed adjacent the high voltage alternating current input terminals 83 is a switch 86, which is adapted to control a plurality of tubular resistances 87. These resistances 87 are suitably supported at one side of the equipment, and are adapted to be air-cooled as by means of the holes 88 drilled into the side of the box 80 at the front thereof, and disposed at the lower portion of the front of the box as indicated in Figure 7. These holes 88 permit air to be drawn into the interior of the box past the rectifying tubes and around the tubular resistances 87 to the holes 89 drilled in one side wall of the box. Convection currents, caused by the heating of the rectifying tubes and by the heating of the resistances, are sufficient to cause movement of air past the tubes and the resistances and out through the openings 89. It will be noted that the openings 88 are drilled in such manner as to slant away from the interior of the box, so as to direct the air currents upwardly over the surface of the rectifying tubes and out past the resistances and also to keep rain out of the box when in use in the field.

A suitable plug 90 is provided for connection to any low source of alternating current, such as a 115 volt source from an ordinary lighting circuit, and is employed at all times to heat the filament circuit of the rectifying tubes. This alternating current input, through the plate winding of the transformer, is also for the purpose of supplying direct current to the low tension testing circuit or for low voltage measurements with the loop, whereas the high tension alternating current led into the terminals 83 is rectified to direct current for the purpose of maintaining a current through the fault while the loop measurements are being made, or for other miscellaneous testing.

The entire structure, including the panel 82, the base panel 91, and the supporting frame members 92, is adapted to form a rigid construction which is cushioned upon the resilient surface of the projection 81 of the box.

A three pole switch is provided for the purpose of shifting from the lower alternating plate current input through plug 90 and transformer 108, to the high tension alternating current input to the terminals 83. This switch is indicated in its entirety by the reference numeral 93. It comprises an arched panel supporting plate 94 secured to the panel 82, and which is provided with a central elongated opening 95 adapted to receive the operating stem 96 of the switch member 97. The top of the stem 96 is provided with a circular insulating disc member 98, upon which the operating knob 99 is mounted. The arched metal plate 94, together with the disc 98 and the insulating knob 99, is adapted to prevent arcs from creeping up the switch 97 and the stem 96 and coming into contact with the operator, which may be dangerous in cases where the voltages used are relatively high. The switch contacts are indicated at 100 and 101, and are mounted upon the blade members 102 and 103 for receiving the corresponding parts of the switch member 97. The switch contacts 100 are adapted to be engaged when the low voltage supply is to be used, and the switch members 101 are adapted to be engaged when the high tension supply circuit is to be used.

The center tap of the high tension alternating current input is connected to the limiting resistance switch 86 and through there to the resistances 87 which thereby control the current input.

A wire wound fixed resistance 105 is provided for the purpose of providing a constant load at 110 volts direct current output. This is used in connection with the low tension testing circuit or the low voltage supply for the loop, and is mounted upon a subpanel 106 which also carries suitable direct current output fuses (not shown) for protecting this circuit.

In connection with the low tension testing circuit and source of low voltage supply, a combination filament and plate transformer is provided, as indicated at 108, and is connected into the circuit of the mercury vapor rectifying tubes 109. These tubes 109 are mounted in suitable sockets 110, and are provided at their upper surfaces with springs 111 which are engaged by a suitable cross frame member 112 for the purpose of holding the tubes securely, but resiliently, in position. A suitable filament rheostat 113, which in this particular embodiment of the invention comprises a 20 ampere, .19 ohms rheostat, is provided for the purpose of controlling the heating circuit supply current to the mercury arc rectifying tubes 109. An alternating current volt meter 114 is provided across this heating circuit, for the purpose of indicating the voltage across the filaments of the tubes 109.

Considering now in detail Figure 15, it will be noted that the tubes 109 have their upper tips securely gripped by the springs 111. One end of each spring 111 is provided with a button portion 111', the other end of the spring being secured to the insulating frame member 112. By pushing on the portion 111' of the spring, the coils thereof are enlarged sufficiently to fit over the tips 109' of each of the tubes, and when the button is released, these coils grip the tip 109' in a firm engagement, thus providing a secure and positive positioning of the tubes, while the coils of the spring between the upper end of the tip and the frame member 112 assure a resilient mounting.

In using the low tension testing circuit, a direct current second volt meter 115 is provided, which may be connected in parallel with a wire wound resistance 116, which preferably is of the order of 300 ohms for this particular embodiment. A single pole, single throw snap switch 118, preferably of special design, is provided for cutting the resistance into and out of the circuit.

A second double pole single throw snap switch 119 is provided for the purpose of controlling the low tension alternating current led into the plug member 90, and suitable fuses 120 in this embodiment, of the order of 1 to 2 amperes, are provided for protecting this circuit.

If desired, an auxiliary resistance 131 may be provided for the purpose of maintaining a constant load at high voltages, and may be regulated by means of a tap switch or the like, but we find that this has not been necessary in the operation of the equipment.

Figure 9:
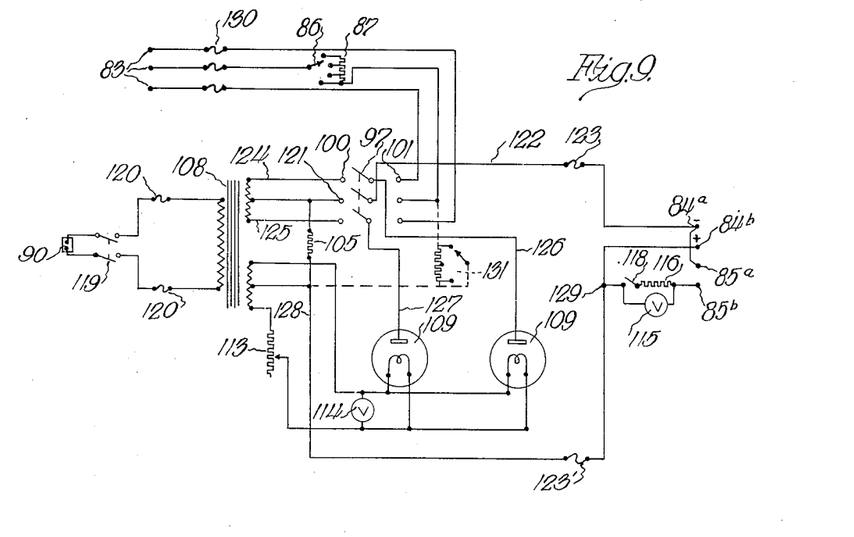
Figure 9 is a diagrammatic circuit for the low tension testing equipment and the direct current supply set.

Considering the apparatus disclosed in Figures 5 to 7, inclusive, in connection with the circuit diagram shown in Figure 9, we have indicated corresponding parts of the apparatus by the same reference numerals. Various modifications may be made in the low tension testing circuit and the direct current supply set without departing from the scope of the present invention. For instance, all the fuses could be omitted except those in the input lead from the low and high tension alternating current inputs. The primary of the filament plate transformer 108 could be tapped at a suitable point so that the set may be used where other than a 115 volt supply is available, and the size of the core might be increased for using the set on a 25 cycle or other frequency of supply current. Also, the voltage capacity of the direct current supply set could be increased as by adding several more or increasing the size of the mercury vapor rectifying tubes and correspondingly changing the transformer, although we have found that for practically all purposes the capacity of a low or medium direct current voltage is sufficient. Further, a small transformer might be utilized for the plate voltage supply for high tension use which could be made an integral part of the set. In increasing the voltage capacity of the direct supply set, the number of resistances should be correspondingly increased, and the capacity of each could also be increased, if desired. Also, a direct current voltmeter could be installed across the output terminals 84ª and 84ᵇ of the direct current supply set. It is to be understood that all such changes or modifications come within the scope of the present disclosure.

Considering now in detail the rectifier circuit, the input current is introduced from a suitable source of alternating current supply through the plug member 90, and, by closing the snap switch 119, this current is passed to the combination filament and plate transformer 108. The switch 97 has previously been moved into engagement with the contact 100, and the center contact thereof, indicated by the numeral 121, is directly connected with the conductor 122 leading through the fuse 123 to one of the low tension output terminals 84ª and 85ᵇ. The other two contacts are connected with the conductors 124 and 125, leading from the plate transformer 108, and lead through the conductors 126 and 127 to the plates of mercury vapor rectifying tubes 109. The filaments of the tubes 109 are heated by means of the circuit connected with the rheostat 113, and a suitable volt meter 114 is connected across these lines to determine the voltage input to the filaments of the tubes. The center tap of the secondary of the transformer 108 is connected through the conductor 128 and the fuse 123' to the terminal 84ᵇ and to a suitable point 129 leading to the volt meter 115 and, when the switch 118 is closed, through the parallel fixed resistance 116 to the other of the low tension output terminals 85ᵇ. The fixed stabilizing resistance 105 allows a constant current to pass from the center contact 121 of the secondary into the center conductor 128 of the heating circuit. This resistance is preferably of the value of 6,000 ohms, and thus provides a constant load, in this embodiment approximately 18 milliamperes, at the direct current output voltage of 110 volts which is used for the low tension testing circuit or the loop. The terminal 85ᵇ is connected to the faulted conductor 9 and the terminal 85ª is connected to ground, although this is optional, and the resistance of the fault can then be determined from the reading on the voltmeter 115. Similar tests between various conductors should also be made. From this resistance, it is possible to determine the magnitude of the voltage required to maintain a current through the fault for Murray loop location. By grounding the line at the far end and repeating the test, the continuity of the conductors may be determined. The jumper 11 having been placed across the far ends of the faulted conductor 9 and the clear or less faulted conductor 8, the continuity of the loop conductors is then checked by the low tension testing set and is positively determined by the Wheatstone bridge arrangement to be described hereinafter.

With reference to the low tension testing circuit, as incorporated in the rectifier circuit or direct current supply set, this circuit comprises the input connections 129 and 84ª, which may or may not be connected to the rectifier circuit, since any other direct current supply could be used. The faulted conductor is then preferably connected to terminal 85ª, and terminal 35ᵇ is connected to ground, ordinarily the sheath, although these connections may be reversed. For fault resistances of small size as compared to the resistance of the voltmeter 115, the switch 118 is closed through the parallel resistance 116 into the circuit.

Because of the voltage drop characteristic, the input voltage divides between the resistance of the fault and the resistance of the voltmeter, or the resistance of the voltmeter and the parallel resistance 116, and the voltmeter readings are then directly inverse to the resistance of the fault. For example, assuming the resistance 116 to be of the order of 300 ohms, and the resistance of the fault to be about 600 ohms, the voltmeter will read only one-third of the voltage input. As the resistance of the fault increases, the voltmeter readings decrease, and when the lowermost portion of the voltmeter scale is reached, where readings are inaccurate, the switch 118 is opened, and the readings immediately are at the other end of the scale, due to the increase in resistance through the voltmeter. Thus it is possible to always maintain the voltmeter readings within that portion of the scale where readings may be accurately made because of the parallel resistance and the voltage drop characteristics of the circuit.

Figure 2:
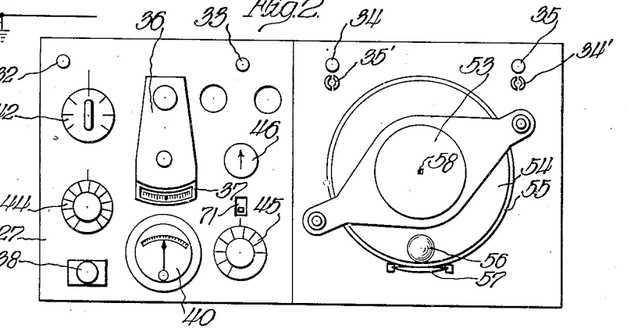
Figure 2 is a plan view of the loop and Wheatstone bridge equipment.
Figures 3, 4:
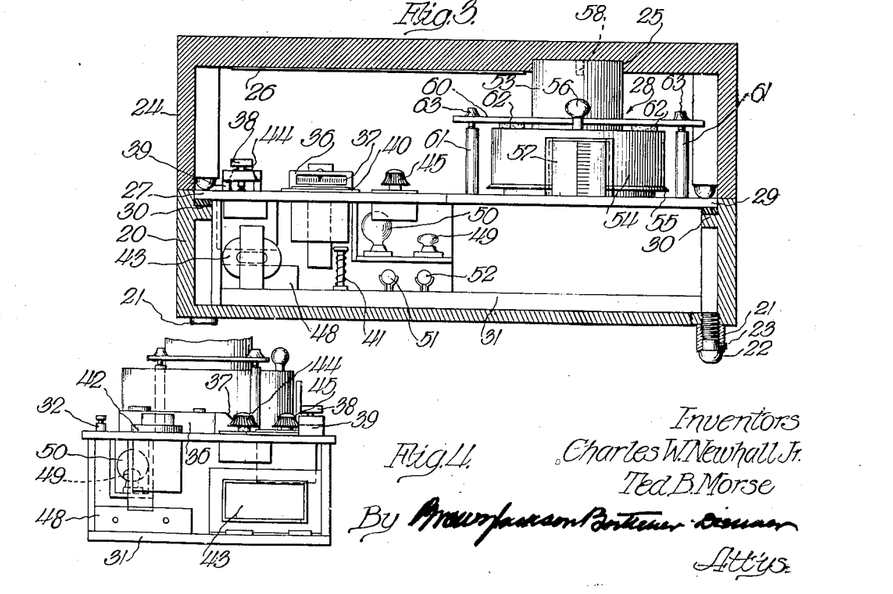
Figure 3 is a sectional elevational view of the apparatus shown in Figure 2.
Figure 4 is an end elevational view of the apparatus shown in Figures 2 and 3.

Considering now in more detail Figures 2, 3, and 4, the apparatus embodied in these figures comprises the Wheatstone bridge for determining the resistance of both conductors, and the Murray loop for determining the exact location of the fault by means of the spiral slide wire. The apparatus is adapted to be housed in a suitable box 20, which may be of wood, metal or similar encasing material, and which is provided with the extending leg or stud portions 21, having rubber tips 22 inserted therein for insulating the box when it is placed in position, and for preventing entry of dirt into the stud portions which receive the insulating legs, these tips being held within the studs 21 by means of the screws 23. Three such tips are provided. The box is provided with a suitable cover 24, which is recessed, as at 25, for receiving the upper portion of the slide wire mounting. If desired, the slide wire drum may be mounted upon a subpanel to reduce the vertical extent of the unit, and thus decrease the height of the box. The box may be provided with suitable latches at the side thereof for securing the top 24 thereto, and the case may be provided either with a handle or with suitable strap means for permitting easy carrying of the same when it is desired to use the apparatus in the field. Charts and calculation tables 26 are secured to the inner surface of the top 24, where they are readily accessible when the apparatus is in use. The boxes may be of any convenient shape so as to reduce their weight and to make them convenient for carrying and the like. The operating parts of the apparatus are mounted upon a panel 27, formed of bakelite or other suitable insulating material, and the slide wire, indicated in its entirety by the numeral 28, may be mounted upon a panel 29 disposed in the same plane as the panel 27, or may be mounted upon a sub-panel, which will reduce the height thereof so that the top 24 of the box 20 may be made of less height. The panels, as shown in the preferred embodiment of the invention, are adapted to rest upon suitable projections 30 formed in the interior of the box and which are lined on the top with rubber, which permit the apparatus to nest within the lower part of the box 20. The mounting of the equipment upon the main panel with the attached subpanel permits the entire equipment to be removed to facilitate inspection and repair work.

A lower case or panel 31 is provided upon which the apparatus is adapted to rest. This may also receive the slide wire drum. Suitable structural members may be provided for the purpose of making the assembly rigid and non-vibratory. It will be noted that all controls, switches, terminals, etc., are mounted on the panels, and that all stationary parts of the equipment are mounted below the panel 27.

The direct current input connection is indicated at 32, and is adapted to receive direct current from the direct current supply set or from other sources ranging from zero up to the limiting value of the line or instrument, the one side of this circuit being grounded as pointed out above.

The terminals for measuring the resistance, when the device is being used with the Wheatstone bridge arrangement, are indicated by the numerals 33 and 34, and these terminals are connected to the terminals of the clear conductor 8 and the faulted conductor 9 when such measurements are being made.

The terminal 34, together with the terminal 35, is used for the determination of the location of the fault, when the loop, or spiral slide wire, is being used, and these binding posts may be so constructed as to receive either "spade" type of lugs from the respective leads, or may be constructed for reception of the "plug" type of lugs.

A galvanometer 36 is shown as mounted upon the panel 27, and is provided with the beveled or angularly inclined indicating face 37, which may be illuminated by a small lamp for properly viewing the markings thereon. The galvanometer may be of any approved type of suitable sensitivity, and is connected in circuit by means of a suitable galvanometer key 38 which is adapted to contact with the circuit contact 39 for inserting the galvanometer into the circuit and releasing it therefrom. This key may, if desired, be a telephone type of key. In the preferred embodiment of the invention, the galvanometer has a 45° scale, and is provided with a 12 ohm coil designed for operation with a 20 ohm shunt. The sensitivity of the meter is two microamperes per millimeter of scale division.

A milliammeter 40 is also provided upon the panel 27, and preferably ranges, in the embodiment of the invention, from 100–0–100 milliamperes. A suitable fixed resistance 41 is mounted upon the base 31, and is preferably fixed at a resistance of one ohm. This resistance is provided for the purpose of converting the Murray loop into a plain Wheatstone bridge arrangement.

A tapped shunt 42, of the order of 20 ohms, is provided in the circuit and is adapted to be inserted between the opposite terminals of the galvanometer 36. A suitable damping inductance 43 is mounted upon the base panel 31, and is controlled by the tapped switch indicated at 44. Disposed upon the opposite side of the milliammeter 40 is a suitable switch indicated at 45, which is provided with tapped contacts for shifting from the Murray loop to the Wheatstone bridge circuits. This switch is the only instrument that need be operated when changing from one to the other of the circuits, and is accompanied by a change of connections to the binding posts. In one position it is open, and neither circuit is then operative. In its other two positions it selectively closes the loop circuit or the bridge circuit.

A second switch 46 is disposed adjacent the galvanometer 36, and controls a suitable single pole double contact swing switch for shunting out the slide wire and galvanometer circuit during preliminary adjustments of the apparatus at high voltages. A milliammeter shunt switch of the snap type is indicated at 71, for shunting the current around the milliammeter 40.

Disposed at the rear and laying upon the base panel 31 are a suitable number of dry cell batteries 48 for supplying current when the resistance measurements are made during the operation of a Wheatstone bridge circuit. These batteries are preferably capable of supplying 4½ volts for the resistance measurements and are provided at each of their terminal points with means for connecting them into and out of the circuit. Leading from the positive side of the battery is a conductor connected to the lamp 49, which lamp is provided for the purpose of limiting the current when resistance measurements are being made. It is rated at 3.8 volts in this particular apparatus. Adjacent the lamp 49 is a second lamp having 1000 ohms resistance, which is placed in the loop circuit and is used as a current limiting device with the apparatus when the loop is being used for locating the fault in the conductor. This lamp is indicated at 50. If desired, a suitable fixed resistance, such as a wound wire resistance, may be substituted for the lamp 50 for limiting the current during loop measurements.

Suitable protective devices are provided for both the galvanometer and for the milliammeter and current limiting lamp 50. These comprise neon or vacuum filled spark gap members indicated at 51 and 52, and which are supported upon the base member 31. Other equivalent protective devices might be employed for this purpose within the scope of the present invention.

Considering now in detail the spiral slide wire, which has been indicated by the reference numeral 28, this slide wire is of standard make, and is provided with series resistances at each terminal which are capable of increasing the sensitivity of the wire. The slide wire is of the type shown in Patent No. 819,355, issued May 1, 1906, to Leeds and Northrup, or may be of the Weston type. By the use of these resistances, indicated diagrammatically in Figure 8 by numerals 67 and 69, the effective length of the slide wire may be increased in order to provide greater accuracy of the slide wire for exceptionally long conductors. However, we have found them to be unnecessary in ordinary practice. These resistances may be cut out with the plugs 34' and 35'. The slide wire mounting comprises the housing 53, and the annular casing member 54 which is provided with a flared lower edge 55 carrying suitable graduations for indicating the position of the casing with respect to the spiral wire enclosed thereby. A suitable knob 56 is disposed on the casing 54 for facilitating rotation thereof and a suitable sight glass 57, preferably having a metallic protector, or casing, is provided, which is preferably marked for indicating the number of turns of the spiral slide wire which are exposed, and which, together with the graduations 55, is capable of accurately indicating the extent to which the slider has been moved along the wire resistance. This corresponds to the indication of the position of the movable contact 14 about the periphery of the loop 12 in the diagrammatic circuit illustrated in Figure 1. The housing 53 is provided with a recess 58 located centrally in the top thereof, this recess being adapted to receive an extension rod for rotating the housing when it might be dangerous for the operator to rotate it from a position in proximity thereto, such as when extremely high voltages are being used.

In order that the accuracy of the slide wire shall not be destroyed due to transportation vibrations, we have provided a suitable resilient cushioning clamp, indicated at 60, which is supported upon suitable posts 61 disposed upon the panel member 29, the clamp having the enlarged central portion adapted to fit over the housing 53, and being also provided with the cushioning members 62, which may be of sponge rubber or the like, and which are adapted to bear against the upper peripheral face of the casing 54. When the device is being transported, the clamp is positioned in place, and is held upon the posts 61 by means of the nut 63 threaded thereon. This clamping member serves to resiliently clamp the casing 54 and to prevent movement thereof during transportation. It is removed during operation of the testing equipment.

It will be noted that the instruments and the controls thereof are compactly arranged, with the terminals connected to the high tension leads disposed at the rear of the apparatus, or away from the operator. The inclined face of the galvanometer enables the operator to read the indications thereon without approaching a dangerous position in proximity to the apparatus. The milliammeter, the galvanometer switch, and the reading glass for the slide wire are also positioned at the front of the apparatus for the same reason. Suitable openings are provided in the panel 27 above the lamps 49 and 50 for the purpose of observing their operation, and also for ventilation.

Figure 8:
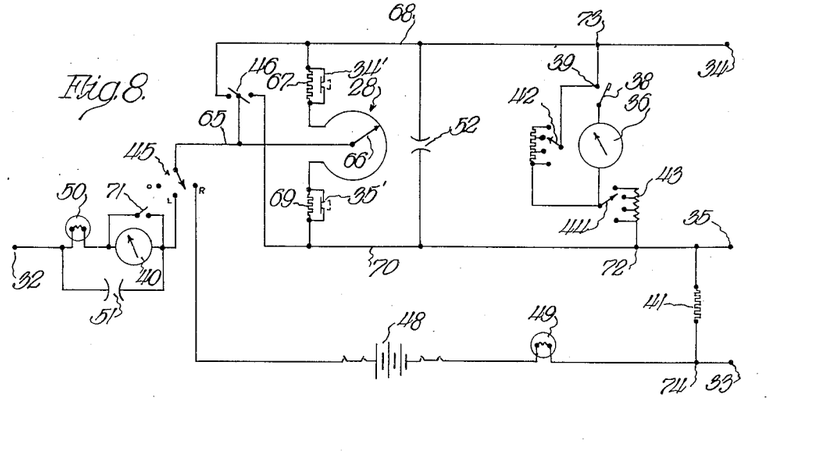
Figure 8 is a diagrammatic circuit for the loop and Wheatstone bridge equipment.

Considering now the apparatus disclosed in Figures 2, 3, and 4 in connection with the circuit diagrammatically illustrated in Figure 8, corresponding parts will be indicated by the same reference numerals. In this circuit, the input direct current enters through the terminal 32, passes through the current limiting lamp 50, and through the milliammeter 40 to one terminal of the switch 45. The neon filled spark gap 51 is provided for the purpose of preventing excess surge currents from damaging the milliammeter 40 and the lamp.

Assuming now that the switch 45 is so disposed as to effect a connection between the terminal leading from the direct current input, this current is lead through the conductor 65 to the contact 66 of the slide wire, indicated generally at 28. From this point, the current divides itself and part of it passes through the slide wire and through the conductor 68 to the loop terminal 34. The other portion of the current passes through the conductor 70 to the loop terminal 35. Positioned between the two terminals 34 and 35, and connected across the conductors 68 and 70, is the galvanometer 36, which is connected in series with the tapped inductance 43, controlled by the switch 44, and which is capable of being placed in the circuit by means of the contact key 38 engaging the contact 39. The special high current capacity shunt 42 is provided for the purpose of protecting and providing critical damping of the galvanometer while preliminary measurements are being obtained. This shunt may be used to by-pass the heavy surge currents when measurements are made with a fluctuating supply voltage. The action of currents which may be induced in the cable line, due to outside sources, are reduced in effect upon the galvanometer by means of the series reactance, or inductance 43. If desired, a condenser shunt may replace the inductance or resistance shunt, or both.

It is thus apparent, that, when the switch 45 is so connected as to provide a loop measurement, that the current will pass through the slide wire and to the two terminals 34 and 35, which are connected, by means of suitable leads, to the terminals of the clear conductor and the faulted conductor. The switch 46, the switch 71, and the key 38, may be so arranged that the milliammeter 40 and the slide wire 28 will be shorted, and the galvanometer 36 cut out during preliminary breakdown and voltage tests on the conductor, for the purpose of protecting this apparatus during these preliminary measurements. The neon spark gaps 51 and 52 are for the purpose of providing safety devices in the event that a high voltage, due to surges or other means, is impressed across these points while a measurement is being made. It is thus apparent, that after the preliminary measurements have been made, the switch 71 and the switch 46 are opened, and the slide wire 28 is rotated until, when the key 38 is depressed into contact with the contact 39, the galvanometer 36 will show no current flow between the conductor 68 and the conductor 70. This indicates that the loop is in a balanced condition, and from the position of the sliding contact 66 with reference to the slide wire 28, the distance that the fault is located with respect to the terminal end of the conductor can be calculated.

The Wheatstone bridge is applied after the conductors have been shorted by a jumper across the far end in order to check the low tension testing set in the determination of the continuity of the conductors and to measure their resistances. The switch 45 of the bridge is moved to the position wherein it contacts the contact R, as shown in Figure 8, and the leads are placed in connection with terminals 33 and 34 and the batteries 48 then supply current for making the Wheatstone bridge measurements. It will be noted, during these measurements, that the direct current supply coming into the terminal 32 is not connected, and therefore the lead to the terminal 32 need not be disconnected while the resistance measurements are being made. All that is necessary to change from the resistance circuit to the loop circuit is to manipulate the switch 45 to the proper position and change the lead from terminal 33 to terminal 35. The current now passes from the battery 43 to the switch 45 and to the slide wire 28. From the slide wire, which might be considered the dividing point of the current, a portion of the current passes through the conductor 68 to the terminal 34. The other portion of the current passes through the conductor 70 and thence through the resistance 41 to the terminal 33. The terminal 34 is connected to the clear conductor 8, and the terminal 33 is connected to the faulted conductor 9, these connections, of course, being optional, the far ends of these conductors being short circuited by means of the jumper wire 11. It will thus be apparent that a Wheatstone bridge circuit has been set up.

This bridge circuit comprises first, the resistance of the slide wire from the contact member 66 to the terminal point 73 of the galvanometer connection, which may or may not have the series resistance 67 inserted therein. The second portion of the bridge comprises the resistance from the galvanometer connection, indicated at 73 through the terminal 34 and the calibrated lead to the clear conductor 8, and thence through the jumper 11 placed at the farther end thereof, and thence through the faulted conductor 9 and the other calibrated lead to terminal 33 and connection point 74. The third leg of the bridge circuit is the resistance of the slide wire 28 from point 66 to the terminal point 72 of the galvanometer connection, which may or may not include the series resistance 69. The fourth leg of the bridge is the resistance from the connection point 72 through the fixed resistance 41 to the connection point 74. Since the proportions of the resistances of the slide wire, the leads for the terminal connections 33 and 34, and the fixed resistance 41 are known, and since the resistance of the jumper 11 is known, the resistances and, consequently, the continuity of the conductors 8 and 9 can be determined.

Thus, when the contacting member 66 is positioned on the slide wire in the proper position to balance the galvanometer 36, the continuity of the conductors can be easily determined through the application of the Wheatstone bridge formula. By reference to suitable tables showing resistance per unit of length of the various sizes of conductors, this resistance will show whether, for a given length of conductor, this resistance is such as to indicate continuity of conductors.

As an alternative and preliminary check for continuity, the conductor may be grounded at its far end during the testing of the resistance of the fault by the low tension testing circuit, in order to provide a return path for the current supplied through the conductor by the testing circuit, and an appreciable flow of current will indicate continuity. The conductor may also be grounded at the far end to the sheath, or to an adjacent clear or less faulted conductor to check continuity of conductors with the low tension testing circuit. In cases of conductors not in the same sheath, they can be shorted or grounded at their far ends to determine continuity.

The resistance of the fault and the continuity of the conductors having been determined by means of the low tension testing circuit and the Wheatstone bridge circuit, respectively, the next step in the location of the fault is to provide, by means of the direct current supply set, a sufficiently high direct current voltage to maintain a satisfactory current through the fault. (In this embodiment of the invention about 15 milliamperes.) This direct current voltage is supplied either by the direct current supply set, or, where the resistance of the fault is such that the voltage necessary to maintain a current thereacross is greater than the capacity of the supply set, other suitable direct current supply sources may be used, such as a 30 kilovolt Kenotron portable outfit, or any other suitable portable or permanently installed direct current supply, up to the limiting insulation value of the line or set. However, for most situations encountered in the field, we have found that the low tension direct current voltage is sufficient for fault location. The high tension direct current voltage is only necessary in cases where it is necessary to maintain an arc to ground.

In order to increase the sensitivity of the device, we have found that by limiting the current flow through the fault within a range between 15 and 100 milliamperes, instruments which have their greatest sensitivity within this range may be employed, and by the use of a substantially universally variable direct current supply source, the voltage supplied to the conductor can be positively controlled so as to limit or maintain the current flow through the fault within this predetermined range. This is distinctly advantageous, in that the instruments employed for the balancing of the current flow will thus always read within their most sensitive range, and burning of the conductor at the fault will be maintained at a minimum. Further, the instruments employed for a current flow of this range are easier to manufacture, and because of their size and design are such as to increase the portability of the device over that of a device wherein no limitation of the current flow is maintained. Also, because of the universality of voltage application, the sensitive instruments, by reason of the shunt circuit employed, can be used for burning through the fault by shunting out the sensitive equipment and then applying sufficient voltage to accomplish this purpose.

With terminal 84ᵇ grounded, terminal 84ᵃ, of the direct current supply set is used as a supply, and in this embodiment is connected to the terminal 32 of the Murray loop circuit. This keeps the filaments of the tube at ground potential. The switch 71 is closed, the switch 46 is closed, and the galvanometer key 38 is opened for the purpose of short circuiting the milliameter, the slide wire, and opening the galvanometer circuit during preliminary breakdown and voltage trials on the conductor. This protects the slide wire and the loop circuit during these preliminary trials. The other terminal 84ᵇ leading from the direct current supply set is grounded as described in connection with the diagrammatic illustration of Figure 1.

The alternating current high voltage input, if necessary is led into the direct current supply set through the terminals 83, the circuit being protected by suitable fuses indicated at 130. The center tap of this supply is led to the switch 86, which controls the tubular resistances 87. From the terminals 83, the current is led to the contact 101 of the three pole switch, and the switch member 97 is moved to contact therewith.

The center contact of the switch is connected by means of the conductor 122 and fuse 123, with the negative terminal of the direct output terminal 84ᵃ. The side contacts of the switch 97 are connected with the alternating current supply conductors leading thereto through the switch contacts 101, and the current is carried, by means of the conductors 126 and 127, to the plates of the mercury vapor rectifying tubes 109. The filaments of these tubes are heated by means of the filament winding of the transformer 108, and the current admitted to the filament is controlled by means of the secondary rheostat or resistance 113, the indication of the voltage passing through these filaments being shown by the voltmeter 114. The conductor at the center of the secondary of the transformer, indicated by numeral 128, leads through the fuse 123' to the positive side of the direct current output terminal 84ᵇ.

If desired, a suitable tapped resistance 131 may be provided for the purpose of maintaining a constant load at high voltages, and corresponds generally to the fixed resistance 105 used for the same purpose in the low tension testing circuit. However, we have found that this resistance does not seem to be necessary.

The reading on the slide wire scale will then give the proportions of the resistance through the clear or less faulted conductor, through the jumper and back along the faulted conductor to the fault as compared to the resistance of the calibrated leads being included for both. Knowing the size of conductor and its length, and thus its resistance, and the resistance of the leads and jumper, all preferably calibrated in feet of length, the relative proportions will give the percentage length to the fault as compared to the total length of the conductor. From this the location of the fault can be accurately determined.

Figure 13:
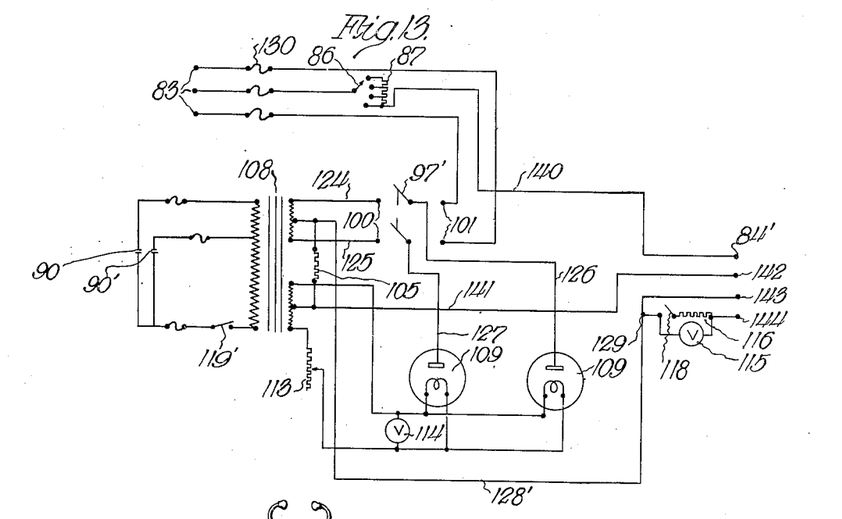
Figure 13 is a modified diagrammatic circuit for the low tension testing equipment and direct current supply set.

In the simplified direct current supply and testing circuit disclosed in Figure 13, we have eliminated the center switch contact 121 shown in Figure 9. In this circuit, the conductor 140 leads directly from the current limiting resistance 87 to one of the high tension terminals 84'. The switch 97' is now only a double pole double throw switch, and contacts respectively with the switch contacts 100 and 101.

The fixed resistance 105, which provides a constant load at the low tension voltage, is positioned as shown in Figure 9, between the midpoints of the two transformer coils. When it is desired to use high tension direct current voltages for maintaining a current across the fault, the switch 97' is engaged with the contacts 101, and one of the terminals 84' or 142, preferably the latter, is grounded, the ungrounded terminal being connected to the direct current input terminal 32 of the bridge and loop circuit.

However, when it is desired to use the direct current supply set at low voltage with the loop or for low tension testing purposes, the switch 97' is engaged with the contacts 100, and the low tension alternating current is led in from the plug 90 through the switch 119. In this embodiment, it will be noted that the primary of the transformer 108 is tapped intermediate its ends and a second plug 90' is provided for connection to the low tension alternating current supply when it is desired to use other than standard voltages. The switch 119', corresponding to the switch 119 of Figure 9, is likewise transposed to the position shown in Figure 13. This circuit is similar to that described in connection with Figure 9, the low tension terminals being the terminal 142, and the terminal 144, the terminal 144 being connected to the transformer coil through the conductor 128'. When only the voltmeter reading is desired, or for making a low tension test for the measurement of the resistance of the fault with an outside source of direct current, the terminals 143 and 144 are used in a manner similar to that described in connection with Figure 9. The terminals 142 and 143 are used for supplying low voltage direct current to the loop circuit, and terminals 84' and 142 are used for the medium voltage supply.

This simplified circuit thus provides four sets of terminals, the terminals 84' and 142 being used for high tension direct current output, the terminals 142 and 143 being used for low tension direct current output, the terminals 142 and 144 being used for low tension testing purposes, and the terminals 143 and 144 being used when it is desired to use the voltmeter with an outside source of direct current. The operation of the remainder of the circuit is substantially the same as described in connection with Figure 9.

As pointed out above, in connection with Figure 8, the negative terminal 84ᵃ leads to the terminal 32 of the Murray loop circuit, and the positive terminal 84ᵇ is grounded. The terminals 34 and 35 of the loop circuit are connected by means of suitable leads, to the clear or less faulted conductor 8 and the faulted conductor 9. These leads are indicated more in detail in Figures 11 and 12.

Figure 11:
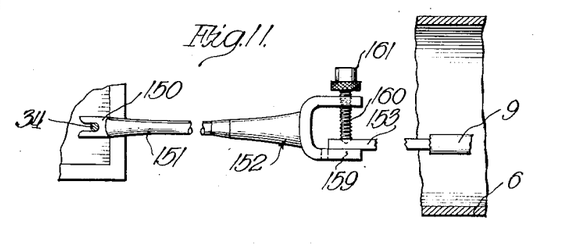
Figure 11 is a diagrammatic view showing the manner in which the equipment is connected, through the calibrated leads, to the terminals of the conductors.

In Figure 11 I have shown one of the calibrated leads connecting the Murray loop circuit or the bridge circuit to the conductors. This lead comprises the "spade" type of lug 150, which engages a suitable binding post, such as the post 34 or 35 of Figure 2, and which is held in position by means of a suitable terminal nut. A cable 151 leads from the terminal lug 150, and is preferably provided with flexible insulating covering such as a molded rubber covering or the like. In the embodiment of the invention, the calibrated leads are provided in ten and sixty foot lengths, and their resistances are calibrated in terms of the length of the size conductor in the cable so that the equivalent length of the lead can be inserted in the calculations for locating the fault. The other end of the cable 151 is provided with a clamping member indicated generally by the numeral 152, and which is shown more in detail in Figure 12. The clamping member is adapted to have firm electrical engagement with the terminal end 153 of the conductor 9, which conductor is disposed within the sheath 6 of an underground cable. This terminal end may be a switch lug, terminal top, wire end or the like.

Figure 12:
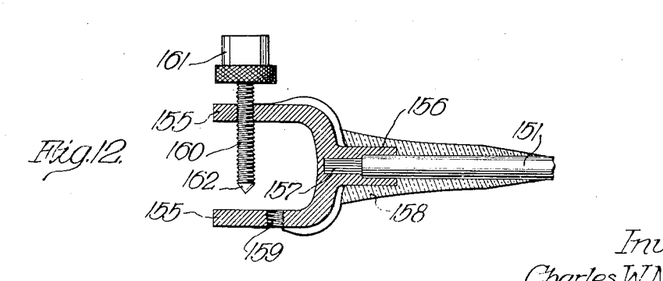
Figure 12 is a detailed sectional view of the clamping members shown in Figure 11.

Referring now to Figure 12, in which I have shown a detail sectional view of the clamp, this clamp comprises the clamping arms 155, preferably formed integrally with a yoke member and forming a U-shaped clamping bracket, which bracket is provided with the extending shank portion 156. Integral reinforcing ribs may be formed on the clamp for strengthening the same and preventing spreading of the arms 155 thereof. The cable 151 is led into a suitable recess provided in the shank 156 of the clamp, and the bare ends of the conductor extending therethrough, indicated by the numeral 157, are sweated or swaged into firm engagement with the interior portion of the clamp, to form a good electrical contact therewith and to provide a constant resistance. Suitable insulation, such as tape, or molded insulation, indicated at 158, is provided, extending from the inner ends of the two clamping arms 155 past the shank portion 156 and for a substantial distance along the cable 151.

It will be noted that this insulation 158 is tapered, providing a flexible connection for transmitting movement of the clamp with respect to the cable 151 equally along the length of the cable, in order to avoid wearing of the cable at the point at which it enters the shank 156.

Each of the arms 155 is provided with a threaded opening 159, which is adapted to receive the shank 160 of a clamping bolt 161. It will be noted that the opening 159 on one of the arms 155 is spaced a greater distance from the end of the arm than the other opening. Preferably the opening 159 spaced closest to the shank 156 of the clamp 152 is used, and the clamping bolt 161 is threaded therethrough, this bolt having a pointed end 162 adapted to bite into the extending terminal end 153 of the conductor 9. The opening spaced farther away from the shank is only used when, because of the shape of the terminal end 153 of the conductor, it is impracticable to use the other opening. This is for the purpose of preventing spreading of the arms and for securing a positive electrical connection with the conductor. Adapters may be provided for connections where special terminals are employed. The leads may be coiled about an iron core to reduce alternating current induction currents, or a choke or large condenser may be employed for this purpose.

In the operation of the testing equipment, the calibrated leads are provided for both the clear conductor 8 and the faulted conductor 9, and are connected respectively to the binding posts 34 and 35 of the apparatus shown in Figures 2 to 4. In order to secure accuracy of results, the leads 151 are interchanged, in order to provide an average contact resistance, the clamps 152 being alternately disposed upon each of the conductors 8 and 9, and the spaced terminal lugs 150 also are alternately disposed upon each of the terminal members 34 and 35 of the equipment. In this manner, it is possible to obtain four different readings and the average of these readings will give the desired result.

Figure 10:
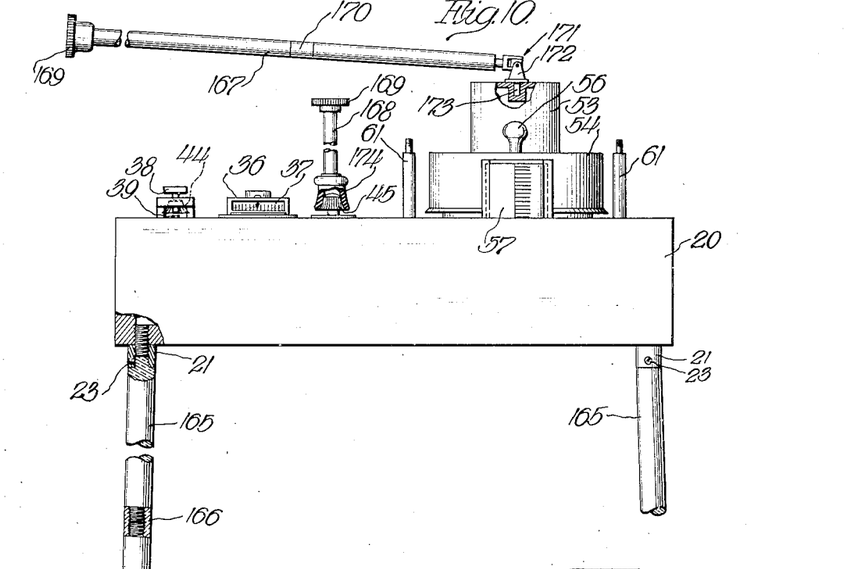
Figure 10 is an elevational view, partially in section, showing the insulating operating rods used when the apparatus is being operated under high voltage, and showing the manner in which the apparatus is mounted for operation.

In using high tension direct current for the loop measurement, in order to maintain a current across the fault, it becomes necessary to properly insulate the loop and bridge circuit equipment, in order that the operator may safely manipulate the same and to prevent a flash to ground. As shown in Figure 10, the studs 21 are adapted to receive insulating legs, formed of Bakelite or the like, and indicated by the reference numeral 165. These legs preferably are formed of two pieces, and have the metal sleeve 166 interposed therebetween, so that the legs may be disconnected and the two sections thereof are short enough to fit within one of the boxes housing the testing equipment. The box 20, containing the loop and bridge circuits, is thus mounted upon a tripod formed of insulating legs, which effectively insulates the equipment from ground.

It is also desirable that the various instruments to be operated be insulated from the operator. This is accomplished by the use of a pair of Bakelite operating rods 167 and 168, each of the rods being provided with a knurled knob portion 169 for rotating the same. The rods may also be provided in two sections, with a metal sleeve 170 interposed therebetween, in order to facilitate their disposition within the boxes. The rod 167 is provided with a universal joint connection 171, from which depends a bracket member 172 having an extending stud portion 173 which fits within the recess 58 formed in the top of the housing 53 of the slide wire. This may be threaded into the opening 58, or the opening may be formed square, as shown, or otherwise for the purpose of providing rotation of the slide wire housing 54, when the operating knob 169 is turned. By the provision of this rod, it is possible for the attendant to remain a safe distance from the equipment and still operate the same.

The operating rod 168 is provided at its lower end with a flexible rubber member 174, which is recessed and ribbed to provide an opening for receiving the control knobs 45, 46, 43, 38, and 44 when it is desired to rotate the same. These insulated rods, together with the insulated legs upon which the box 20 is mounted, serve to maintain suitable insulating means between the operator and the equipment when the equipment is being used with high voltage. The economy effected in reduction of size and space requirements by the use of these rods is considerable. As an alternative, the control knobs may be of metal with flexible grounding leads.

In Figure 14 we have disclosed a tracer signal circuit superimposed upon the direct current supply circuit, which enables a check of the location of the fault in order to verify the location found by use of the loop equipment. This tracer signal circuit could be superimposed upon any direct current supply circuit as a means of locating a fault. In this modification, since the fault 10 is grounded to the sheath 6, a direct current, supplied by a circuit indicated generally by the numeral 178, such as the direct current supply and low tension testing circuit, is forced through the cable 9 to the fault 10 and from the fault 10 is grounded to the sheath 6, the other side of the direct current supply 178 being also grounded. Since at least a half ampere flow, in most cases, is necessary in order to have a circuit over which a signal may be transmitted, a voltage sufficient to maintain a current flow of one-half ampere through the fault 10 to the sheath must be provided.

An alternating current source is provided, if desired, as indicated generally by the reference numeral 179, and in this circuit is inserted a signal device, such as a buzzer, a rotating commutator, or any suitable signalling mechanism. This signal current is led across the condenser 180, this condenser being provided so that no direct current may flow through this portion of the circuit, the condenser permitting the alternating signal current to flow therethrough, but preventing the flow of direct current, and through the conductor 181 to the terminal 182 of the conductor 9. This signal circuit passes along the conductor 9 to the fault 10 and through the fault to the sheath and ground, thereby completing a circuit with the ground 183 of the signal circuit, returning to the source of supply through the ground or along other paths.

An operator may now traverse the conductor 9, provided with the exploring coil 185, which is mounted in a suitable box provided with headphones, or other type of receiver 186. Extending from the receiver 186 is a hollow insulating tube 187, the tube 187 having secured thereover at its upper end a rubber connection 188 leading to a stethoscope 189, which is fastened over the operator's ears. By traversing the conductor 9, the tracer signal being transmitted therealong will be heard until the point at which the fault 10 is located has been reached. At this point the signal is grounded, and consequently beyond this point no signal can be heard. This is an effective manner of superimposing a signal circuit upon a direct current circuit for checking purposes, and incorporating this signal circuit with the high voltage loop, and we believe this is broadly new. The exploring coil is insulated from the operator, since high voltages are sometimes necessary in order to maintain a current across the fault. This insulation is provided by the insulating tube 187 and the rubber tubing 188.

In the older types of cable testing devices, it was not practicable to install the equipment in a central location from which electrical lines radiate, such as substations and distribution centers, due to the necessity of reducing the resistance of the fault to a low value, and the comparatively limited range of voltage which was applicable to most of these devices.

Because of the fact that the Murray loop of the present invention in most cases eliminates the necessity of fault reduction, due to its universal range of voltage application, it is possible for this apparatus to be set up at various central points, and the trouble may be located with permanently or semi-permanently installed equipment at that point. This is distinctly advantageous.

Since the equipment is used with any applied voltage, it is possible to proceed with the location of a fault immediately after the line has tripped out and the type of fault has been determined. This results in a considerable saving of time in transporting and setting up portable equipment. Further, permanent installation makes it possible to simplify the operation of the instrument, as well as reducing to a minimum possible error due to improper connections and calculations. Also, when using portable equipment, it is necessary to calculate from the readings of the instrument the distance to the fault in feet. By installing the instrument as an integral part of a station or substation, the line and leads for that station will be calculated in advance, so that a reading of the instrument, by reference to a chart or suitable calibrated table, will indicate immediately the location of the fault.

Equipment of this type could be set up in two general forms. The loop of the present invention could be installed at some definite location in a substation, and by means of a switching panel, it could be connected to the line which was faulted. A direct current source of supply would be included as an integral part of the apparatus, since it has been found that for most purposes a direct current source furnishing up to 5000 volts has been satisfactory.

The equipment could also be installed as a semi-permanent arrangement within a substation, being mounted upon a small cart, together with an adequate direct current voltage supply. The calibrated connecting leads would be wound on a reel upon the cart and could be run off to connect to the terminal of the line in trouble. The alternating current supply lead would also be mounted upon a reel carried by the cart.

Other equipment might be advantageously installed with the universal voltage loop, such as the low tension testing set described previously. Further, in some cases, breakdown or fault reduction is necessary, and the direct current source of supply would be used for this purpose. Also, the so-called "capacity bridge" in some cases is useful in locating trouble when the conductor is burned in two. It is also useful on overhead power lines and in telephone work. Further, as described in connection with Figure 14, it is almost always advisable to check a location of a fault made by a Murray loop with some tracer signal or system, which could be included in the equipment.

It is apparent that the cable testing device of the present invention is applicable to any fault in which the conductors are continuous, and is capable for use with any voltage up to the limiting value of the line. The conductors to be tested need not necessarily lie in the same sheath in order to employ the equipment for the analysis and location of a fault. Further, the equipment can be used satisfactorily if two conductors in the same cable are faulted at the same point through different resistances.

In locating a cable fault of this type, wherein two conductors are faulted at the same point, the initial measurements are made in the same manner as described in the case of a single faulted cable. This gives a reading on the slide wire which theoretically places the fault at a point farther out on the conductor than it actually is located.

The jumper between the two conductors at their far ends is then removed, and the measurements are repeated without the conductors being shorted. The first measurement, with the conductors jumpered, gives a value which may be indicated by A. After the jumper has been removed, the second value obtained may be indicated by B. The actual value which should be used for the location of the fault is then found through the use of the following equation:

$$C = \frac{A-B}{.5-B}$$

The use of this formula, with the values obtained above, will give the actual ratio of the length of the faulted conductor up to the fault, compared to the entire length of the conductor and thus giving the location of the point at which the two conductors are faulted.

We do not intend to be limited to the exact

We claim:—

1. The method of analyzing and locating a fault in a conductor by means of a manually portable fault locating device comprising a mercury vapor tube rectifying circuit adapted to be connected to any available alternating current supply source, which comprises metering direct current to said fault for determining its resistance, measuring the approximate resistance of said fault, shorting the far end of said conductor to another conductor, determining the continuity of said conductors, supplying a variable direct current up to the limiting output voltage of the rectifying circuit sufficient to maintain a predetermined limited current flow through said fault irrespective of the resistance thereof, inserting a variable resistance in the circuit, proportioning said resistance to balance current flow to both sides of said fault, and determining the location of said fault by measurement of said proportioned resistances.

2. In a plurality of adjacent continuous conductors faulted at the same point, the method of locating the fault which comprises shorting the far ends of said conductors, supplying direct current voltage sufficient to maintain current flow through the fault, inserting variable resistances in the circuit, proportioning said resistances to balance current flow through said circuit, removing the short at the far ends of the conductors, reproportioning the resistances to balance the current flow through said circuit, and obtaining the ratio of said proportioned resistances to determine the location of the fault.

3. In a Wheatstone bridge set, the combination of a portable housing, an instrument panel mounted therein, said housing having projecting studs at the bottom thereof for receiving insulating members to position said housing away from the ground, high tension direct current input connections, a slide wire mounted on said panel, switches mounted on said panel, and insulated operating means for engagement with said slide wire and said switches to operate the same from a point remote from said housing.

4. In a resistance proportioning device for use in the location of faults in continuous conductors, and capable of attachment to any available power supply means, a portable box-like housing, an instrument panel mounted in said housing, a high tension direct current input terminal on said panel, a spiral slide wire on said panel, a battery mounted in said housing, means on said panel for connecting said high tension terminals to said slide wire or for connecting said battery to said slide wire, socket means in the bottom of said housing, and insulated rod-like leg members engaging in said socket means to position said housing away from ground.

5. In a resistance proportioning circuit, a spiral slide wire, a contactor therefor, a galvanometer connected across the terminals of said slide wire, a high tension direct current source, a low tension direct current source, means for optionally connecting each of said current sources to said slide wire contactor, switching means for by-passing the current from said sources around said slide wire, a shunt in parallel with said galvanometer, a reactance in series with said galvanometer for reducing the effect of current surges and induced voltages upon said galvanometer, a pair of terminals for connection to the resistances to be proportioned and used in conjunction with said high or low tension current sources.

6. In a resistance measuring and proportioning circuit, a spiral slide wire, a contactor therefor, a galvanometer connected across the terminals of said slide wire, a high tension direct current source, a low tension direct current source, means for optionally connecting each of said current sources to said slide wire contactor, switching means for by-passing the current from said sources around said slide wire, a shunt in parallel with said galvanometer to absorb surge currents, control sensitivity, and act as a damping means, a reactance in series with said galvanometer for reducing the effect of current and induced surges upon said galvanometer, means for inserting said galvanometer into said circuit, a pair of terminals for connection to the resistances to be measured and used in conjunction with said low tension current source, and a third terminal cooperating with one of said pair of terminals for use in conjunction with said high tension current source for proportioning said resistances.

7. In a resistance measuring set, a portable box-like housing, an instrument panel, a subpanel spaced therefrom, said panels being supported in said housing, a spiral slide wire housing mounted on said instrument panel, a pair of posts extending vertically at opposite sides of said slide wire housing, a clamping member engaged over said slide wire housing and secured to said posts, said clamping member having cushioning means contacting with said slide wire housing to support the same, and a cover for said portable housing fitting over and enclosing said panels.

8. In a resistance measuring circuit, a high tension current source, a low tension current source, a spiral slide wire, means for connecting said circuit for either high tension or low tension operation, current limiting means connected in said high tension current source, a shunt switch for said slide wire, a galvanometer connecting across the terminals of said slide wire, a shunt for said galvanometer, and terminals connected to the terminals of said galvanometer for connection to the resistance to be measured.

9. In a resistance measuring and proportioning circuit, a high tension current source, a low tension current source, a spiral slide wire, means for connecting said circuit to either the high tension or low tension source, said circuit being operated as a Murray loop circuit with the high tension current source and as a Wheatstone bridge circuit with the low tension current source, current limiting means connected in both said current sources, a shunt switch for said slide wire, a galvanometer connected across the terminals of said slide wire, a shunt for said galvanometer, terminals connected to the terminals of said galvanometer for connection to the resistances to be proportioned, and a fixed resistance connected to one of said terminals when said Wheatstone bridge circuit is used.

10. In a resistance measuring and proportioning circuit, a high tension current source, a low tension current source, a spiral slide wire, means for connecting said circuit for either high tension or low tension operation, current limiting means connected in said high tension current source, short circuiting means for said slide wire, a galvanometer connected in parallel with said slide wire, protecting means connected across the terminals of said slide wire and galvanometer, a shunt for said galvanometer, and terminals connected to the terminals of said galvanometer for connection to the resistance to be measured.

11. In a continuous conductor, the method of locating a fault therein, with a portable fault locating device including a mercury vapor rectifying circuit, which comprises rectifying a low tension alternating current through said circuit and measuring the resistance of said fault by the rectified low tension direct current, correspondingly rectifying a high tension alternating current through said circuit, metering the direct current from said last-named rectification to said conductor to maintain only a predetermined limited current flow therethrough, and balancing said current flow to obtain a resistance ratio.

12. In a cable testing system, a Murray loop circuit including a spiral slide wire resistance, a galvanometer connected across the terminals of said slide wire resistance, a shunt in parallel with said galvanometer, a reactance in series with said galvanometer, a pair of terminals connected to said loop circuit and adapted to be connected to a faulted conductor and an adjacent clear or less faulted conductor, a variable source of direct current supply for said loop circuit adapted to maintain a limited current flow through said fault irrespective of the resistance thereof, a sliding contactor on said resistance for obtaining a resistance ratio, and means for switching a fixed resistance into said circuit to provide a Wheatstone bridge circuit.

13. In an insulated continuous conductor having a fault therein intermediate its ends, the method of locating said fault which comprises connecting a manually portable testing unit to any desired point along said conductor, connecting any available alternating current supply source to said unit, thermionically rectifying the current from said supply source within said unit to provide a direct current supply voltage up to the maximum limiting output voltage of said thermionic rectification, imposing sufficient direct current voltage on said conductor to maintain a current flow through said fault in accordance with the minimum size of equipment compatible with portability and sensitivity of said unit, and proportioning a variable resistance in said unit to obtain a resistance ratio for determining the location of said fault.

14. The method of locating a fault in a continuous conductor which comprises connecting a compact self-contained manually portable fault locating unit to any available alternating current supply source, rectifying said alternating current through a mercury vapor tube rectifying circuit within said unit to produce a direct current voltage, varying said direct current voltage to maintain a current flow through the fault within the maximum range of sensitivity of the unit, and balancing said current flow through a variable resistance circuit to determine the location of said fault.

15. The method of locating a fault in a continuous conductor which comprises connecting a portable fault-locating unit contained within a housing capable of being carried by an individual to any available alternating current supply source, rectifying said alternating current within said unit to produce a direct current voltage, connecting said direct current output voltage of said unit to said faulted conductor, controlling said output voltage over the maximum range thereof to provide a predetermined current flow regardless of the voltage demand, varying the output voltage to maintain a current flow through the fault within the range of sensitivity of the unit, and balancing said current flow through a variable resistance circuit to obtain resistance ratios for determining the location of said fault.

16. The method of analyzing and locating a fault in an insulated continuous conductor which comprises connecting a testing unit to any available low tension alternating current supply source, rectifying said alternating current within said unit to produce a direct current output voltage, measuring the resistance of said fault, connecting said conductor to said unit through a resistance bridge to determine the continuity of said conductor, connecting said unit to a high tension alternating current source, again rectifying said current within said unit to produce a direct current output voltage, varying said output voltage to produce a predetermined current flow through said fault compatible with the maximum range of sensitivity of said unit, and balancing said current flow through a variable resistance circuit to determine the location of said fault.

17. The method of analyzing and locating a fault in an insulated continuous conductor which comprises connecting a portable analyzing and locating device contained in a housing and of a size and weight capable of being transported by an individual, to any available low and high tension alternating current supply sources, rectifying said low tension alternating current within said unit to produce a direct current output voltage, measuring the resistance of said fault with said voltage, connecting said conductor to said unit through a resistance bridge to determine the continuity of said conductor, switching said unit to produce rectification of the high tension alternating current to produce a corresponding direct current output voltage, varying said output voltage to produce a predetermined current flow through said fault compatible with the maximum range of sensitivity of said unit, and balancing said current flow through a variable resistance circuit to determine the location of said fault.

18. A fault locating device comprising a supply set and a variable resistance bridge set, said device being of a size and weight capable of being carried by an individual, means within said supply set for rectifying any available alternating current supply source, means for supplying the direct current from said last-named means of sufficient voltage to bridge the fault of a faulted conductor and to maintain a predetermined current flow through the conductor compatible with the maximum range of sensitivity of said device, and means for balancing said current flow to obtain a resistance ratio for determining the location of the fault.

19. A fault locating device for field use and capable of being carried by an individual to any desired location, comprising direct current supply means within said device capable of rectifying any available alternating current supply which may be connected to said device, said supply means including mercury vapor rectifying means capable of producing a direct current voltage controllable over a consecutive range of voltages up to the maximum limiting output voltage of the rectifying means to maintain a current flow compatible with the maximum range of sensitivity of said device through a faulted conductor to ground when the conductor is connected to said device, and variable resistance means for balancing current flow through said conductor to obtain resistance ratios for determining the location of the fault in said conductor.

20. A portable fault analyzing and locating device for field use capable of being carried manually to any desired point of use, comprising means for selectively connecting said device to low or high tension alternating current supply means, means within said device for rectifying both types of alternating current to produce a direct current output voltage variable over a wide range of voltages, means for connecting said output voltage obtained from said low tension source across a faulted conductor and ground to determine the resistance of said fault, means for determining the continuity of said conductor, a variable proportioning resistance, means for supplying current to said fault from said rectifying means sufficient to operate said device within its sensitive range, and means connected to said variable proportioning resistance for balancing current flow through said fault to determine the location of said fault.

21. In a fault locating device designed to combine maximum sensitivity of operation with minimum size and weight for the production of a unit capable of being carried by an individual to any desired location, the method of locating a fault in a continuous conductor which comprises connecting said device to any desired part of said conductor, connecting said device to any available alternating current supply source, rectifying said alternating current within said unit to provide a low tension direct current voltage for analysis of said fault, increasing the direct current output voltage produced by the rectification to maintain a limited current flow through the fault sufficient to operate said device within its sensitive range, and balancing current flow through a variable resistance circuit in said unit to obtain resistance ratios for determining the location of said fault.

CHARLES W. NEWHALL, Jr.
TED B. MORSE.